(12) United States Patent
Fischmann Torres

(10) Patent No.: US 8,062,514 B2
(45) Date of Patent: Nov. 22, 2011

(54) STRUCTURE TO CONTAIN A LARGE WATER BODY OF AT LEAST 15,000 M³

(75) Inventor: Fernando Benjamin Fischmann Torres, Santiago (CL)

(73) Assignee: Crystal Lagoons Corporation, LLC, Lewes, DE (US)

( * ) Notice: Subject to any disclaimer, the term of this patent is extended or adjusted under 35 U.S.C. 154(b) by 0 days.

(21) Appl. No.: 12/884,842

(22) Filed: Sep. 17, 2010

(65) Prior Publication Data
US 2011/0062067 A1    Mar. 17, 2011

Related U.S. Application Data

(62) Division of application No. 11/819,017, filed on Jun. 25, 2007, now Pat. No. 7,820,055.

(30) Foreign Application Priority Data

Nov. 21, 2006 (CL) .................................. 3225-2006

(51) Int. Cl.
*C02F 1/40* (2006.01)
(52) U.S. Cl. .............. 210/167.15; 4/488; 4/507; 15/1.7; 210/167.11; 210/167.16
(58) Field of Classification Search ................ 210/167.1
See application file for complete search history.

(56) References Cited

U.S. PATENT DOCUMENTS

| | | | |
|---|---|---|---|
| 2,071,520 A * | 2/1937 | Harrison | ....................... 405/107 |
| 2,141,811 A | 12/1938 | Everson | |
| 2,314,767 A | 3/1943 | Burrell | |
| 2,646,889 A | 7/1953 | August | |
| 2,923,954 A | 2/1960 | Babcock | |
| 3,317,925 A | 5/1967 | Vance | |
| 3,406,416 A | 10/1968 | Presby et al. | |
| 3,412,862 A | 11/1968 | Chaplin | |
| 3,419,916 A | 1/1969 | Schankler | |

(Continued)

FOREIGN PATENT DOCUMENTS

CN    1256250    6/2000

(Continued)

OTHER PUBLICATIONS

Singapore Office Action for corresponding application No. 200717963-3 dated Dec. 23, 2010.

(Continued)

*Primary Examiner* — Peter A Hruskoci
(74) *Attorney, Agent, or Firm* — Merchant & Gould P.C.

(57) ABSTRACT

The invention discloses a process to implement and maintain water bodies larger than 15,000 m³ for recreational use, which comprises the following steps:
a.—providing a structure able to contain a large water body larger than 15,000 m³;
b.—feeding the structure of step (a) with inlet water;
c.—measuring water pH;
d.—adding an oxidizing agent to the water contained in the structure of step (a),
e.—adding a flocculating agent in concentrations within 0.02 and 1 ppm with maximal frequencies of 6 days and cleaning the bottom of the structure of step (a) with a suction device to remove precipitated impurities from the bottom of said structure, and;
f.—generating a displacement of surface water containing impurities and surface oils by means of the injection of inlet water according to step (b), which generates said displacement in such a way to remove said surface water arranged in the structure of step (a), which together with step (e) replaces traditional filtering.

14 Claims, 10 Drawing Sheets

U.S. PATENT DOCUMENTS

| | | | |
|---|---|---|---|
| 3,470,091 | A | 9/1969 | Budd et al. |
| 3,540,274 | A | 11/1970 | Shore |
| 3,641,594 | A | 2/1972 | Hough |
| 3,660,957 | A * | 5/1972 | Schankler ............... 52/741.12 |
| 3,695,434 | A | 10/1972 | Whitten, Jr. |
| 3,748,810 | A | 7/1973 | Mattingly |
| 3,788,982 | A | 1/1974 | Zsoldos, Jr. et al. |
| 3,844,760 | A | 10/1974 | Nelson |
| 3,950,809 | A | 4/1976 | Schatzmann |
| 4,090,266 | A | 5/1978 | Price |
| 4,119,535 | A | 10/1978 | White |
| 4,129,904 | A | 12/1978 | Pansini |
| 4,176,058 | A | 11/1979 | Grobler |
| 4,254,525 | A | 3/1981 | Combest |
| 4,263,759 | A | 4/1981 | Miller |
| 4,304,022 | A | 12/1981 | Sommer |
| 4,338,697 | A | 7/1982 | Broadwater |
| 4,343,696 | A | 8/1982 | Hung |
| 4,402,101 | A | 9/1983 | van Zyl |
| 4,519,914 | A | 5/1985 | Etani |
| 4,581,075 | A | 4/1986 | St. Martin |
| 4,640,784 | A | 2/1987 | Cant |
| 4,652,378 | A | 3/1987 | Marikovsky et al. |
| 4,692,956 | A | 9/1987 | Kassis |
| 4,752,740 | A | 6/1988 | Steininger |
| 4,776,053 | A | 10/1988 | Kiraly |
| 4,835,810 | A | 6/1989 | Hugo |
| 4,849,024 | A | 7/1989 | Supra |
| 4,880,547 | A | 11/1989 | Etani |
| 4,889,622 | A | 12/1989 | Newcombe-Bond |
| 4,948,296 | A | 8/1990 | Salter |
| 4,952,398 | A | 8/1990 | Tapin |
| 5,039,427 | A | 8/1991 | Conover |
| 5,106,229 | A * | 4/1992 | Blackwell ............... 405/52 |
| 5,107,872 | A * | 4/1992 | Meincke ............... 134/56 R |
| 5,108,514 | A | 4/1992 | Kisner |
| 5,143,623 | A | 9/1992 | Kroll |
| 5,172,445 | A | 12/1992 | Chandler |
| 5,245,723 | A | 9/1993 | Sommer |
| 5,293,659 | A | 3/1994 | Rief et al. |
| 5,337,434 | A | 8/1994 | Erlich |
| 5,346,566 | A * | 9/1994 | White ............... 156/71 |
| 5,398,361 | A | 3/1995 | Cason |
| 5,454,129 | A | 10/1995 | Kell |
| 5,662,940 | A | 9/1997 | Hight et al. |
| 5,802,631 | A * | 9/1998 | Friedman ............... 4/506 |
| 5,842,243 | A | 12/1998 | Horvath et al. |
| 5,985,156 | A | 11/1999 | Henkin et al. |
| 6,149,819 | A | 11/2000 | Martin et al. |
| 6,280,639 | B1 | 8/2001 | Ortiz |
| 6,284,144 | B1 | 9/2001 | Itzhak |
| 6,303,038 | B1 | 10/2001 | Sanders et al. |
| 6,317,901 | B1 * | 11/2001 | Corpuel ............... 4/487 |
| 6,409,926 | B1 | 6/2002 | Martin |
| 6,419,840 | B1 * | 7/2002 | Meincke ............... 210/767 |
| 6,444,176 | B1 | 9/2002 | Yoshinaga et al. |
| 6,539,573 | B1 | 4/2003 | Caccavella |
| 0,226,896 | A1 | 11/2004 | Lovestead et al. |
| 7,252,843 | B2 | 8/2007 | Moore et al. |
| 7,862,712 | B2 * | 1/2011 | Tak ............... 210/167.13 |
| 2003/0094421 | A1 | 5/2003 | Gargas |
| 2003/0228195 | A1 | 12/2003 | Mizutani |
| 2004/0025269 | A1 | 2/2004 | Pichon |
| 2004/0129644 | A1 | 7/2004 | Unhoch |
| 2004/0211450 | A1 | 10/2004 | Stoltz |
| 2006/0169322 | A1 | 8/2006 | Torkelson |
| 2006/0174430 | A1 | 8/2006 | Pareti |

FOREIGN PATENT DOCUMENTS

| | | |
|---|---|---|
| DE | 2 141 460 | 2/1973 |
| DE | 19515428 | 11/1996 |
| DE | 297 16 994 | 1/1998 |
| DE | 19814705 | 10/1998 |
| DE | 198 60 568 | 12/1998 |
| EP | 0 352 487 | 1/1990 |
| EP | 0 468 876 | 1/1992 |
| EP | 0 483 470 | 5/1992 |
| EP | 1 420 130 | 5/2004 |
| EP | 1688562 | 8/2006 |
| ES | 2001429 | 5/1998 |
| FR | 2 544 005 | 10/1984 |
| FR | 2 668 527 | 4/1992 |
| FR | 2 685 374 | 6/1993 |
| FR | 2 740 493 | 4/1997 |
| GB | 1494005 | 12/1977 |
| GB | 2045606 | 11/1980 |
| GB | 2 243 151 | 10/1991 |
| JP | 59-222294 | 12/1984 |
| JP | 4-115008 | 4/1992 |
| JP | 5-220466 | 8/1993 |
| JP | 04073612 | 8/1993 |
| JP | 5-261395 | 10/1993 |
| JP | 7-310311 | 11/1995 |
| JP | 3026643 | 1/1996 |
| JP | 10-169226 | 6/1998 |
| JP | 2001-3586 | 1/2001 |
| JP | 2001-9452 | 1/2001 |
| JP | 2002-90339 | 3/2002 |
| JP | 2002-282860 | 10/2002 |
| JP | 2003-190989 | 7/2003 |
| JP | 2003-200173 | 7/2003 |
| JP | 2004-958 | 1/2004 |
| JP | 2005-288392 | 10/2005 |
| JP | 2006-68624 | 3/2006 |
| JP | 2006068624 | 3/2006 |
| JP | 2007-500073 | 1/2007 |
| KR | 20-0162956 | 9/1999 |
| TW | 432013 | 8/1987 |
| TW | 482186 | 12/1990 |
| WO | WO 8101585 | 6/1981 |
| WO | WO 9848132 | 10/1998 |
| WO | WO 03/010388 | 2/2003 |
| WO | WO 2006069418 | 7/2006 |
| WO | WO 2007029277 | 3/2007 |
| WO | WO 2007/059562 | 5/2007 |

OTHER PUBLICATIONS

Second Singapore Office Action for corresponding application No. 200717963-3 dated Dec. 23, 2010.

Pakistan Examination Report.

African Regional Intellectual Property Organization (ARIPO) report for corresponding application No. AP/P/2007/004242 dated Dec. 7, 2010.

Japanese Office Action for corresponding application No. 2007-299975 dated May 31, 2011—translation provided.

Peruvian Technical Report for corresponding application No. 000244-2007 dated Sep. 2, 2010—translation provided.

Office Action for corresponding U.S. Appl. No. 12/884,872 mailed Mar. 1, 2011.

World Health Organization: Guidelines for safe recreational waters. vol. 2. Swimming pools and similar recreational water environments. Switzerland. Jun. 27, 2006 ISBN 92-4-154680-8 Chapter 4.

World Health Organization: Guidelines for safe recreational waters. vol. 2. Swimming pools and similar recreational water environments. Switzerland. Jun. 27, 2006 ISBN 92-4-154680-8 Chapter 5.

International Search Report mailed May 6, 2009, in co-pending related PCT Application No. PCT/US2009/036809.

* cited by examiner

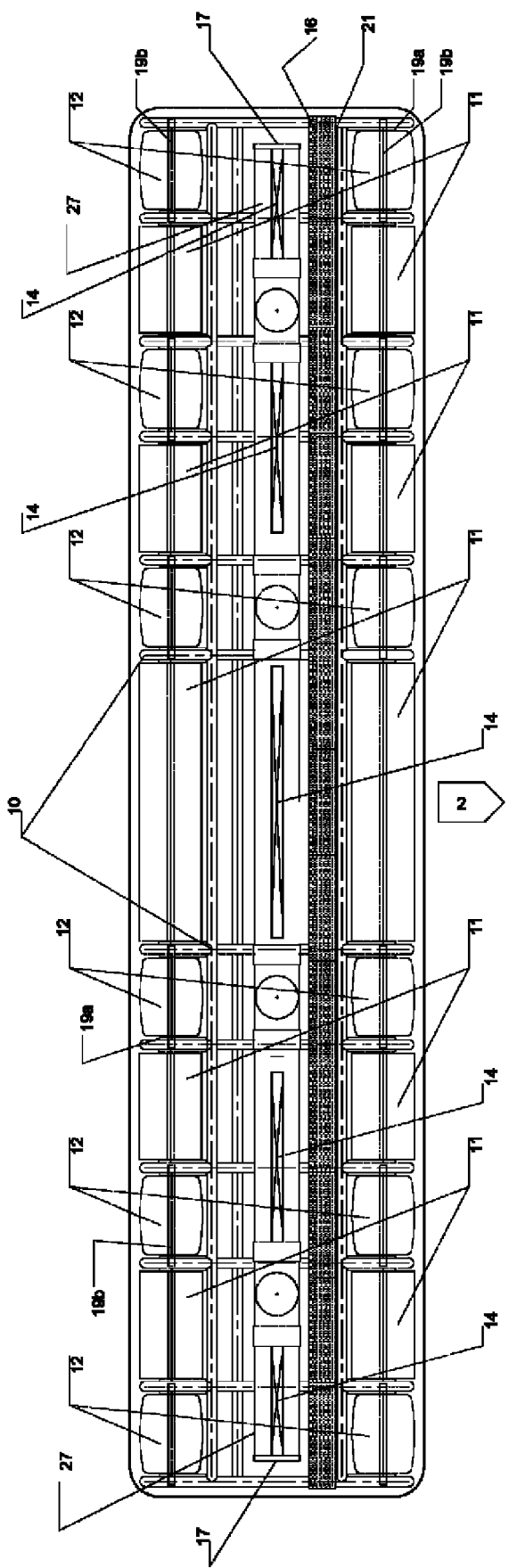

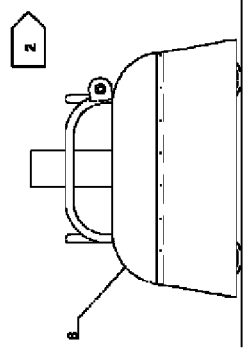
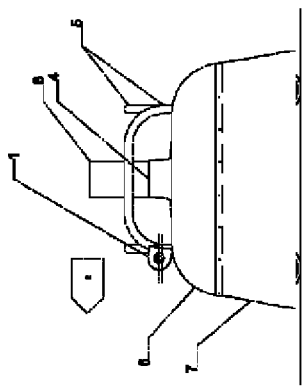
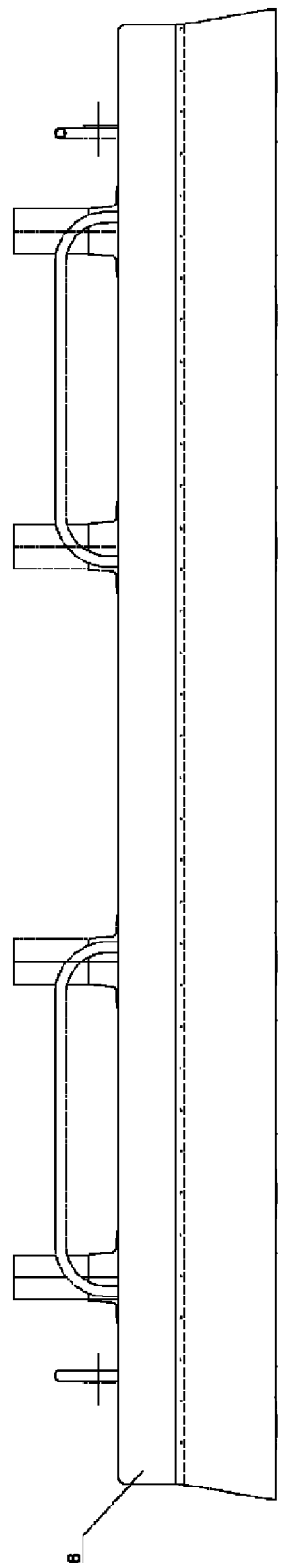

STRUCTURE TO CONTAIN A LARGE WATER BODY OF AT LEAST 15,000 M³

This application is a Divisional of U.S. Ser. No. 11/819,017, filed 25 Jun. 2007, now U.S. Pat. No. 7,820,055, which claims benefit of Serial No. 3225-2006, filed 21 Nov. 2006 in Chile and which applications are incorporated herein by reference. To the extent appropriate, a claim of priority is made to each of the above disclosed applications.

FIELD OF THE INVENTION

This invention discloses a process to obtain (i.e., to implement and maintain) large water bodies or volumes for recreational use, such as lakes or ponds with excellent color, high transparency and cleanness characteristics similar to swimming pools or tropical seas at low cost, in particular for water bodies larger than 15,000 m³. The invention also comprises a device to extract a particulate material decanted from the water by using the aforementioned process. Furthermore, the present invention discloses a structure to contain large water bodies or volumes, which is specially designed to carry out said process. The decantation process together with the device to extract a decanted material from the water, plus the arrangement of the large volume structure with its functional characteristics of water surface displacement, allow replacing traditional filtration as used in conventional swimming pools that would be very onerous and inefficient in systems having large bodies or volumes.

BACKGROUND OF THE INVENTION

When a nutrient enters into water, aerobic organisms consume dissolved oxygen as a result of the induced metabolic activity. Thus, the nutrient exerts a demand on dissolved oxygen availability, which is called biological oxygen demand (BOD). If the amount of organic material in the medium is very high, it can lead to a decrease in dissolved oxygen concentration. At low oxygen levels, aquatic environment promote the growth of anaerobic species.

Anaerobic metabolism is much slower than aerobic processes (typically more than one order of magnitude) have lower efficiency, and generates various intermediate organic compounds (e.g. organic acids, alcohols, methane). As a result of the lower rate of dissolved organic matter consumption, this will accumulate in the aquatic environment.

If dissolved oxygen is consumed faster than it can be replenished, water starts to deoxygenate. No strictly aerobic organism, from microorganisms to fish, will survive in said water. Thus, organic contaminants will accumulate and further establish anaerobic conditions, which generate malodorous substances (e.g. sulfides and volatile amines) and partially oxidized organic compounds.

In addition to bad smell, anaerobic conditions can raise human health issues, because many anaerobic bacteria are pathogenic (for instance, tetanus, and botulism). When the water contains dissolved sulfates, reducing anaerobic bacteria produce $H_2S$ (corrosive and poisonous).

The increase of the amount of nutrients required for life in a water body is called eutrophication. Eutrophication is defined as the process of nutrient enrichment in a water body. It is a natural phenomenon in the ageing process of ponds and lakes (eutrophic lakes). On the contrary, a young water body, poor in nutrients required for life, is called oligotrophic. The nutrient increase in the pond promotes a higher production of aquatic plants and animals. Said organic matter increase generates in its turn an increase of the organic content of sediments. Eutrophication can generate serious problems in superficial water bodies.

Photosynthesis implies the creation of organic matter from inorganic materials and therefore the production of large amounts of organic substances where there were only little amounts before. When algae/plants die, their components are transformed in organic nutrients that exert an oxygen demand.

During photosynthetic action, $CO_2$ is readily consumed, thus producing a rise in pH, which can attain a value over 10. During the night, the inverse reaction occurs, consuming oxygen and generating $CO_2$, with which pH tends to drop. Photosynthetic activity has a significant effect on the pH level of the water body, because it affects the reversible reaction.

$$HCO^{3-}+H+ \leftarrow \text{----} \rightarrow CO_2+H_2O$$

Finally, the masses of algae deposited in the shore die and rotten, thus producing anaerobic conditions, which present health dangers (e.g. formation of *Clostridium botulinum*, a strictly anaerobic pathogen microorganism). On the other hand, aquatic plant ramifications retain organic solids that decompose, which exerts a concentrated oxygen demand.

Generally, nitrogen N and phosphorus P are the limiting factors. In microorganism growth, P is consumed as phosphate, while the major part of bacteria assimilate N under the form of $NH_3$, and only some of them assimilate N as $NO_3^-$. Inversely, algae assimilate N as $NO_3^-$ and very few use $NH_3$. There are more bacteria able to use $NO_3^-$ as oxygen source than as N source. According to the approximate stoichiometry of photosynthesis in algae, N:P ratio is in the order of 7:1. According to the Liebig minimum law, an N:P ratio much higher than 7 in a water body indicates that P is the limiting nutrient; on the other hand, an N:P ratio value much lower than 7 implies an N limitation. Some authors suggest that P and N concentrations higher than 0.015 and 0.3 mg/l, respectively, are enough to generate an excessive growth of algae in lake waters.

The main sources of organic N are proteins, amino acids and urea; on the other side, inorganic N is in the form of $NH_3$, $NO_3^-$, $NO_2^-$. Ammonia is a characteristic product of organic matter decomposition, and it can be microbiologically oxidized to nitrites and nitrates by the action of nitrifying bacteria. These processes occur naturally in water and constitute a major contribution to the biological oxygen demand.

When artificial water bodies are formed, such as lakes or ponds, water quality deteriorates progressively. Depending on the nutrient contribution, it can be reached any state from equilibrium in which algae, aquatic plants, bacteria, insects and fish survive in stable condition to eutrophication processes in which the excessive contribution of nutrients produces a high proliferation of algae and aquatic plants. When these die, they are decomposed by bacteria in aerobic processes that consume the oxygen. When oxygen decreases, many organic remainders remain deposited in the bottom, thus increasing sediments and suffering processes that increase turbidity, bad smells are produced and the physico-chemical and sanitary quality of the water is impaired, which reduces the possibilities of recreational use.

To mitigate these effects different techniques are used, such as aeration systems to increase oxygen levels, algaecides and herbicides to control the excessive proliferation of algae and aquatic plants, the use of biological filters to decrease nutrient contribution, fish and zooplancton to reduce algae, nutrient capture by means of chemicals, inoculation of bacteria to digest organic matter, colorants to improve the aesthetic appearance, mechanic removal of algae and aquatic plants, the use of dredges to decrease the amount of sediment, clarifying agents to decrease turbidity, etc.

The characteristics and quality of the water of these ponds are very different to those of swimming pools. In the first case, an ecological equilibrium between different species must be attained, while in the second case the objective is the removal of organisms and impurities. Therefore, very different turbidity, color and physicochemical characteristics standards are accepted.

To keep swimming pool water transparent and apt for bathing, filtration systems are used, mainly sand, diatomaceous earth and cartridge filtration systems. The entire water must be filtered every 4 to 12 hours, depending on the type of swimming pool.

In addition, organic matter oxidants, disinfectants, algaecides and eventually pH regulators and clarifiers must be used to keep aesthetic and sanitary conditions. Depending on each country's regulation, swimming pools are required to keep minimal disinfectant residual concentrations or permanent redox potential (ORP) levels between 650 mV and 750 mV.

The application of the swimming pool technology to large water bodies to obtain optimal water quality is not possible due to the high cost of the installations and the involved operative costs.

To illustrate this situation, we can recall that if the water body to be filtered is the one described below in the application example of 250,000 $m^3$, complying with the minimal regulations of Chilean Swimming Pools (T=2 en NCh 209, example country for the application), 2,983 liters per second are required to be filtered, which corresponds to the water volume treated by a potable water plant for a city. An Olympic swimming pool has 2,500 $m^3$ (50×25×2 m), which corresponds to 1% of the considered volume in the application example of this patent application.

The same is true when swimming pools chemicals are to be applied to these volumes. The water volume of the application example of this invention corresponds to 4,000 10-meters-long swimming pools.

The control of disinfectants in swimming pools and spas by means of the measurement of the (ORP) has been used for many years with good results. ROP measures the oxidizing power of the disinfectant or, in other words, its real concentration-independent chemical activity. Direct measurement of disinfectant concentration can lead to error, because the activity can be decreased depending on pH and the presence of contaminants, even at high concentrations. In fact, studies have demonstrated that bacterial life in water is more dependent on ROP than on oxidant concentration. To remove undesired microorganisms in swimming pools, normally a ROP value between 650 mV and 750 mV is permanently maintained (public swimming pool regulations in developed countries require more than 700 mV permanently) at a normal pH between 7.2 and 7.6. This is not possible with large water bodies due to the high implied costs.

The previously exposed facts make maintaining large water bodies (over 15,000 $m^3$) using filtration and disinfection technologies similar to those of swimming pools for recreational use largely unviable.

Therefore, there are no large artificial ponds or dams with the aesthetic and sanitary characteristics of swimming pools or tropical seas that have clarity levels higher than 25 and even 40 meters.

The technical problem solved with the present invention is the achievement of these characteristics in large water bodies at low cost.

STATE OF THE ART

Invention patents protecting treatment processes for large volumes of water such as ponds and dams were found at world level. In what follows, an analysis of the most relevant documents and their relation with the technology to be protected is performed.

Invention patent applications JP4115008 and JP7310311 protect artificial ponds connected to the sea that have as objective the purification of sea water. The system allows the entrance of water to the pond, where it follows a path specially designed to remove contaminants or it is conducted to a purification facility to be subsequently returned to the sea. Clearly, the Japanese invention has no relation with the type of pond that is desired to protect in this application.

The invention patent application FR2740493 protects a pool or artificial lake constructed with a flexible bottom comprising a textile net and concrete. The invention includes a draining system and injectors around the border that allow the diffusion of a liquid to the draining system. The analyzed invention does not have relation with the artificial pond or the process that is to be protected.

The invention patent application JP59222294 protects a purification process for river and lake water to remove N, P, BOD (biological oxygen demand), etc. that implies pumping the water through a bed filled with certain mineral. The Japanese invention allows cleaning pond water, but based on water pumping through a packed bed, which is equivalent to filtering the liquid. Therefore, the Japanese invention does not have relation with the technology that is to be protected.

The invention patent application CN1256250 protects a water purification process that includes microflocculation with an inorganic flocculant with high molecular weight and direct deep bed filtration. The analyzed process corresponds to an assisted flocculation with faster and more efficient results, but in no case it affects the novelty or the inventive level of the process of the present invention.

From the analysis of the former documents, it is possible to conclude that there are no processes or artificial ponds similar to those to be protected, which allow obtaining water bodies larger than 15,000 $m^3$ for recreational use, with color, transparency and cleanness characteristics similar to swimming pools or tropical seas at low cost, because in the process of the present invention the traditional filtration step has been substituted by a suspended-solid flocculation step and subsequent cleaning with a suction device, designed for said function, together with the generation of a displacement of surface water that contains impurities and surface oils by means of injecting inlet water and evacuating said water through skimmers (surface slots and dumps) comprised in the structure, and disinfection has been achieved by the application of controlled oxidation pulses.

The present invention is related to a process to obtain large water bodies or volumes (wherein the term obtaining is meant to be understood as implementation and maintenance), wherein a structure is provided (having elements required for water treatment and features that produce the desired results) to contain the water, and separation and flocculation (maintenance) processes of particles that make water cloudy and impure are performed, in such a way that flocculated material is suctioned by a suction device once flocculation has taken place, and oily materials are removed through skimmers (surface slots or dumps) of the structure of the present invention, said structure having pipes that feed fresh water to fulfill the desired objective.

DESCRIPTION OF THE FIGURES

Brief Description of the Figures

Figure 1:
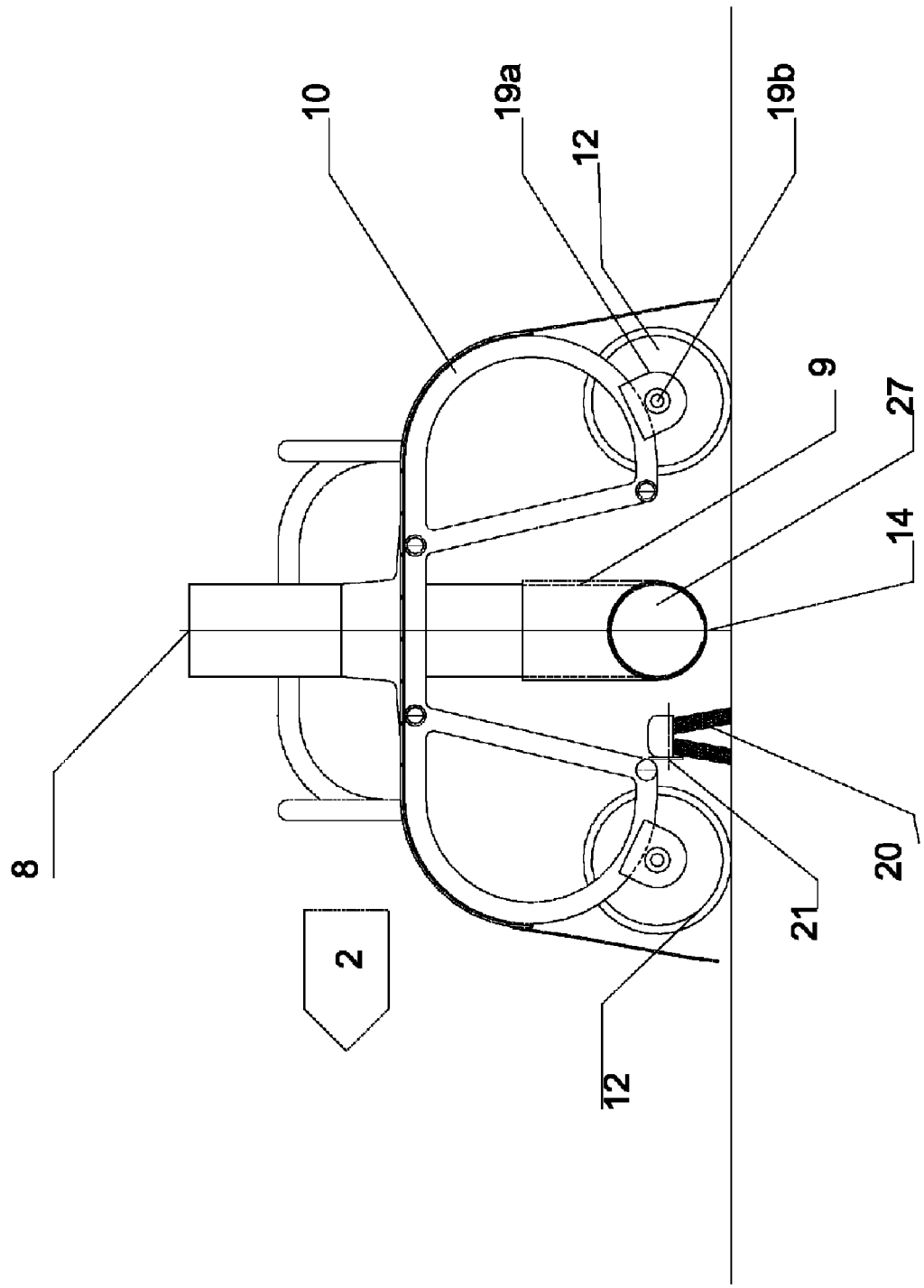

FIG. 1 shows a side view of the suction device.

FIG. 2 shows a top view of the structure of the suction device.

Figure 3A:
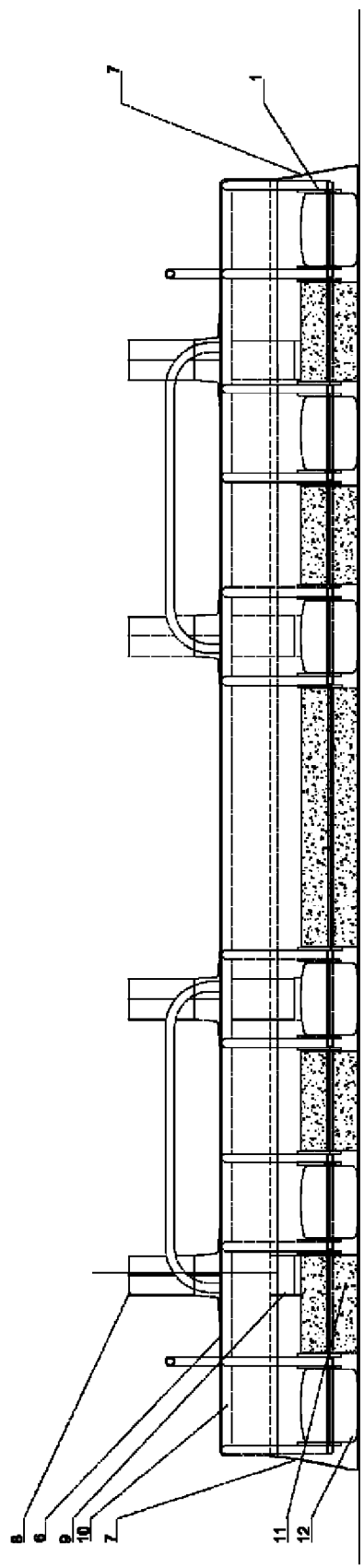

FIG. 3a shows a front view of the structure of the suction device.

Figure 3B:
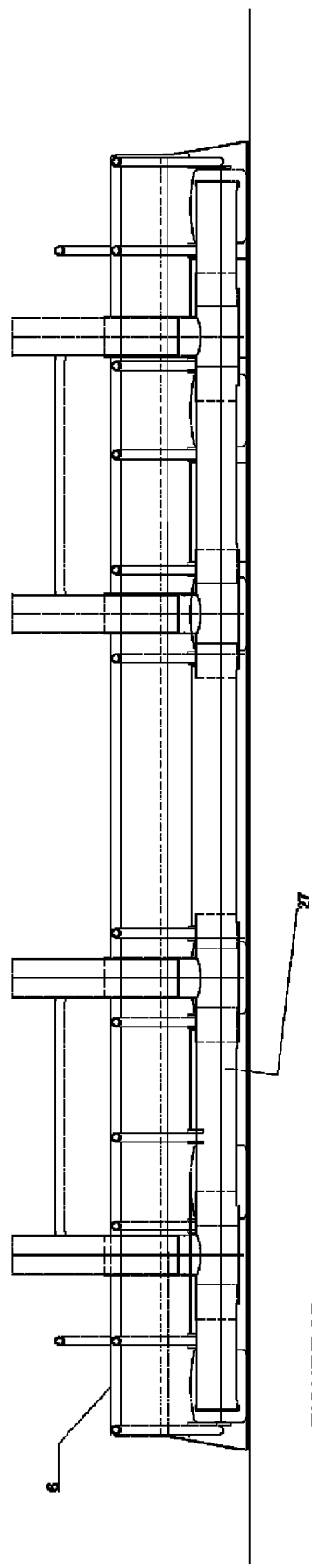

FIG. 3b shows a front view of the structure of the suction device.

FIG. 4a shows a right side view of the suction device.

FIG. 4b shows a left side view of the suction device.

FIG. 4c shows a rear view of the suction device.

Figure 5A:
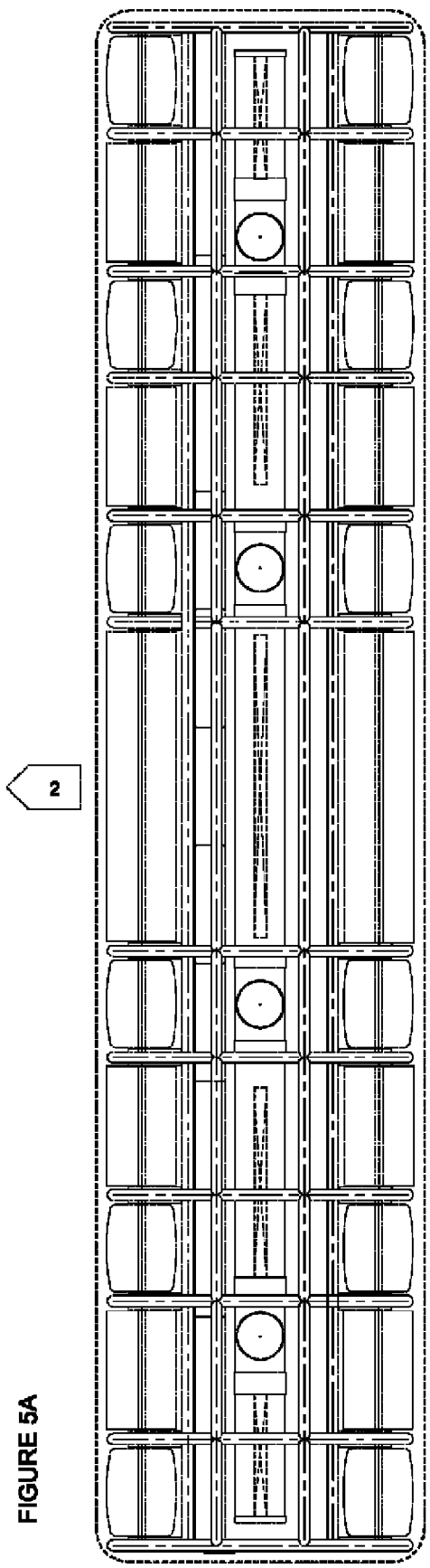

FIG. 5a shows a top view of the structure of the suction device.

Figure 5B:
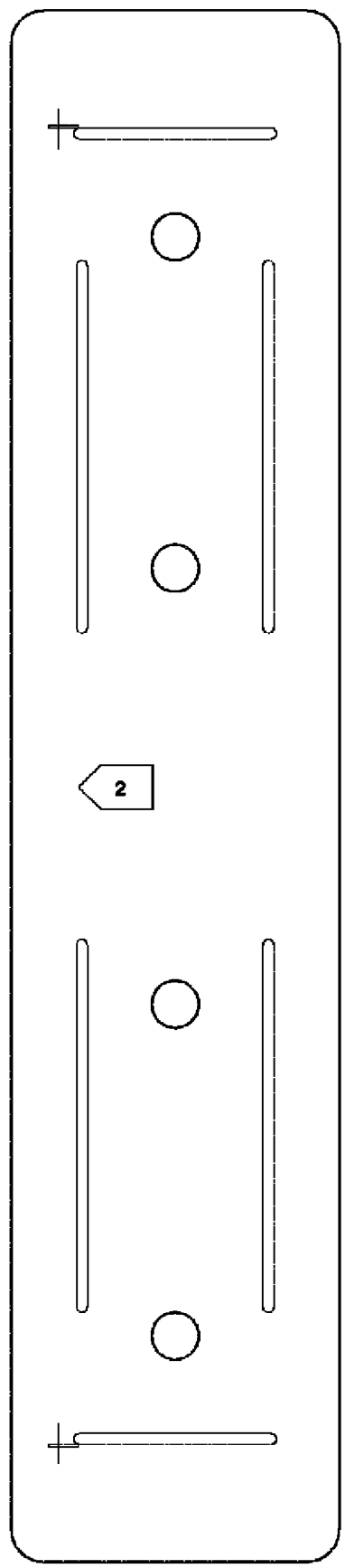

FIG. 5b shows a top view of the suction device.

Figure 6:
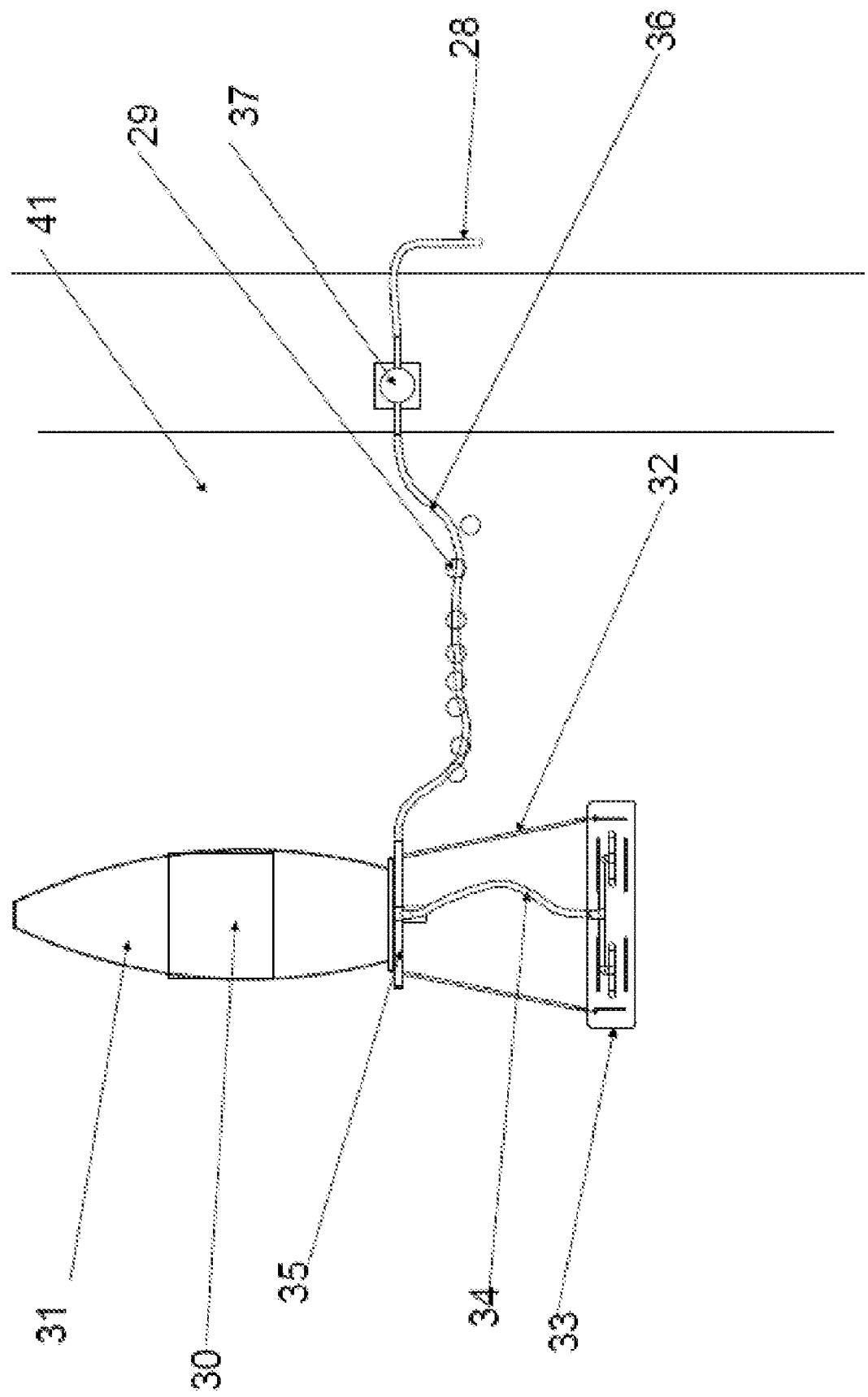

FIG. 6 shows a schematic view of the cleaning system with the suction device.

Figure 7:
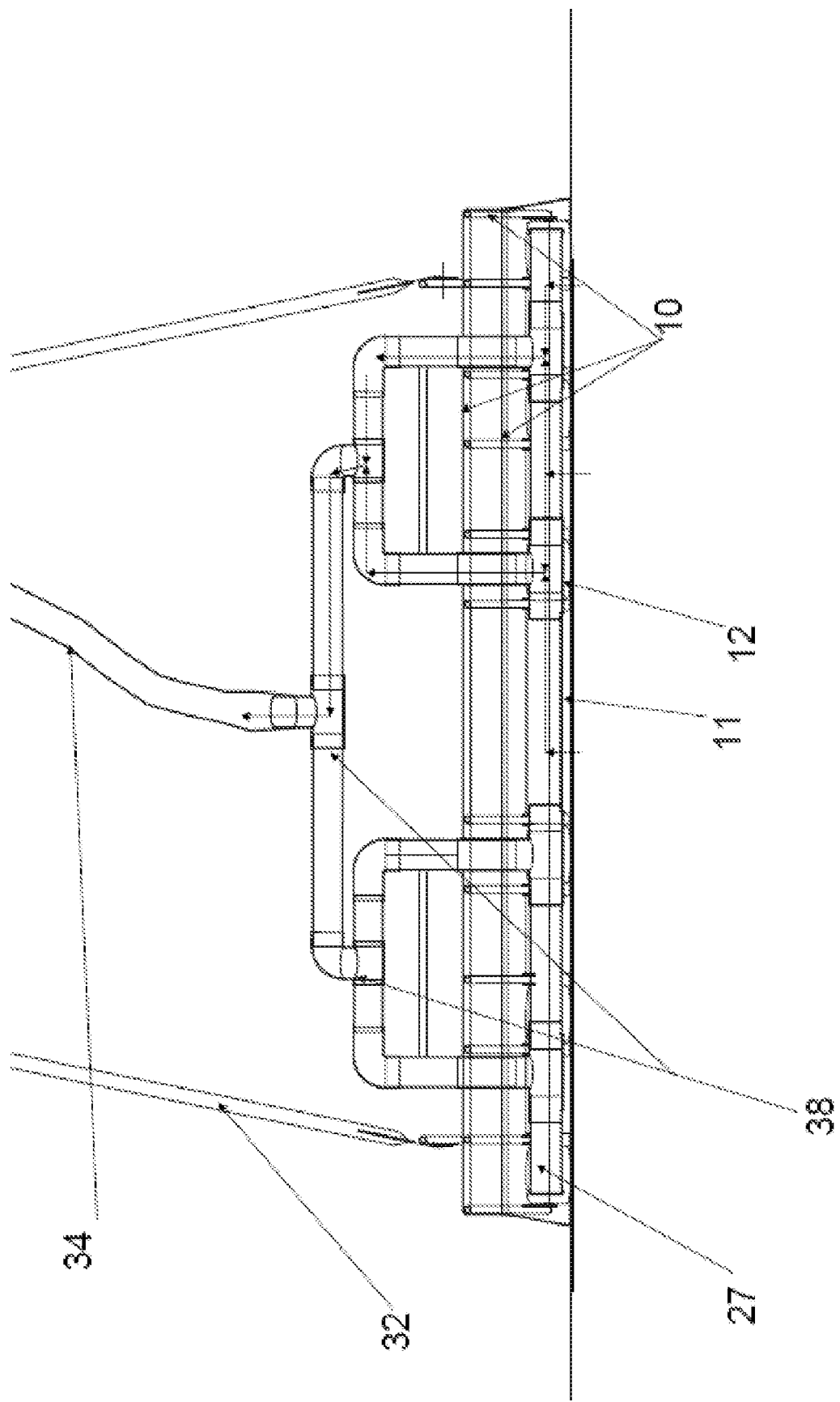

FIG. 7 shows a detailed schematic view of the suction system with the suction device.

Figure 8:
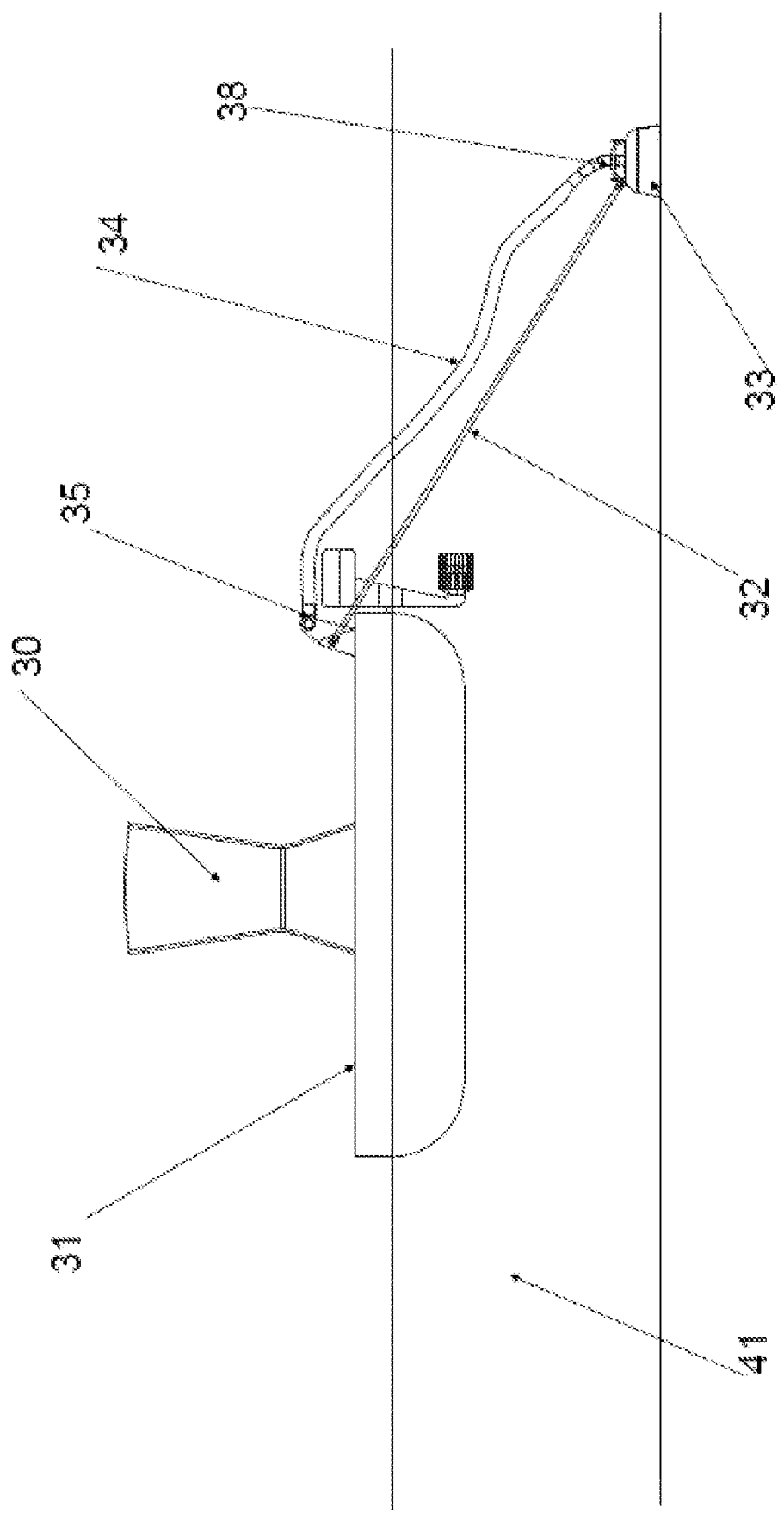

FIG. 8 shows a schematic view of the suction device.

Figure 9:
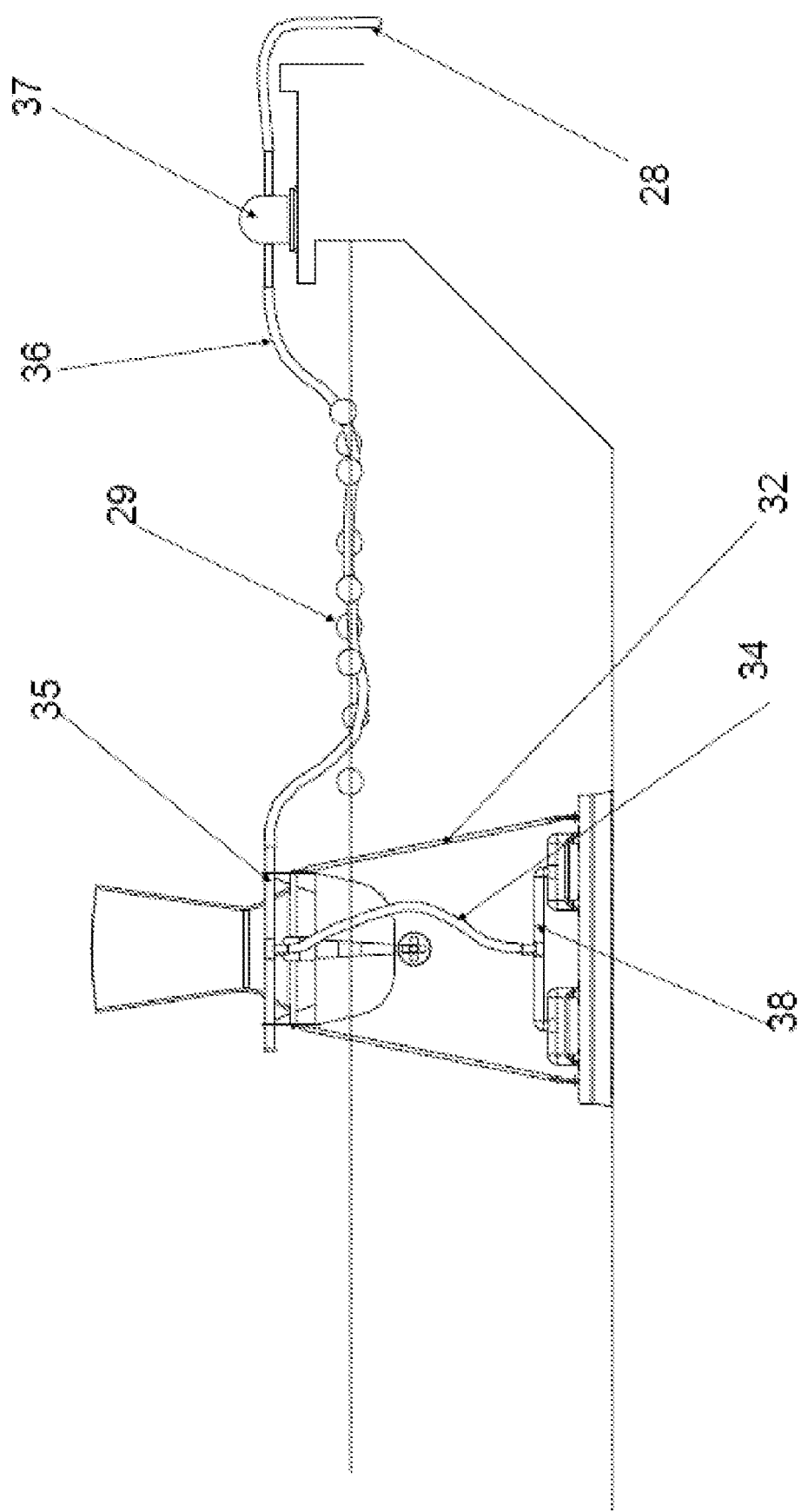
Figure 10:
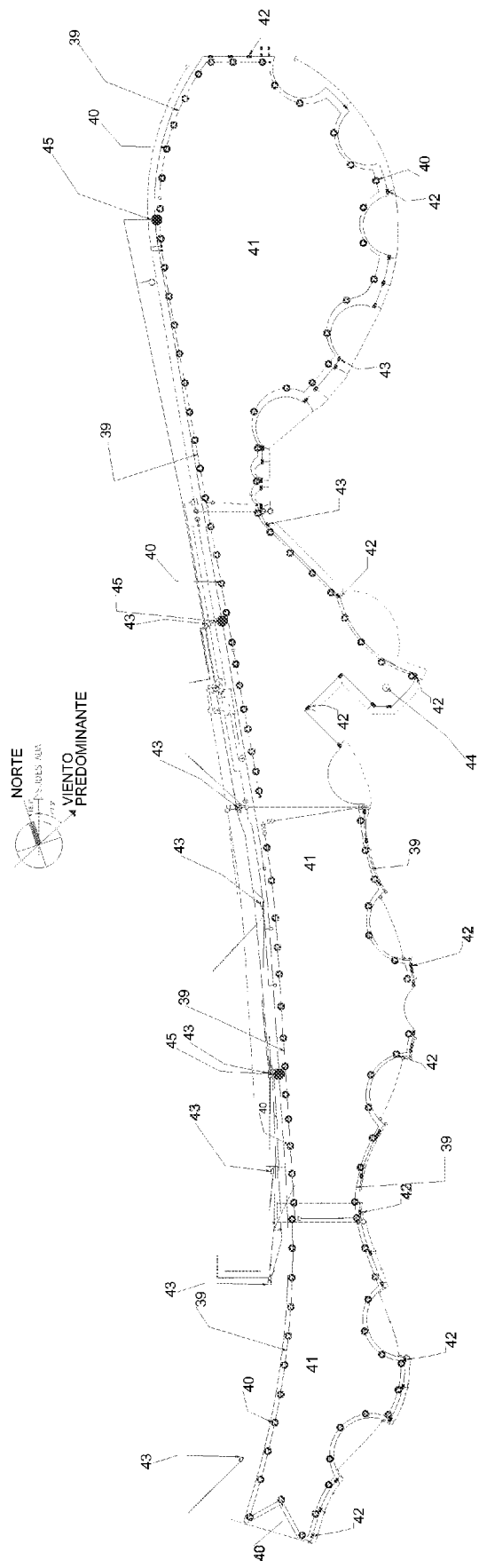

FIG. 9 shows a schematic view of the structure of the suction device;

FIG. 10 shows a top view of the structure of the water body of the present invention.

DETAILED DESCRIPTION OF THE FIGURES

FIG. 1 shows the following components: moving direction (2) of the suction device, PVC pipe for suction connection (8), bottom opening (14) in PVC pipe (27) for bottom suction, sanitary T pipe (9), steel frame (10), auto-lubricated plastic wheels (12), supporting plate (19a) for the axles of the wheels and rollers (19b), plastic-based brushes with synthetic bristles made of polyethylene or the like (20), steel platen with perforations or slots (21) to fasten the brushes (20) in a continuous line.

FIG. 2 shows the moving direction (2); the frame (10) to which supporting plates (19a) are affixed to support wheels and rollers axles (19b) for high density polyurethane rollers (11) that are intercalated with wheels (12), which are lined up and also supported by supporting plates (19a); a brush line (16) fastened to the perforated platen (21) provided with the structure; and the suction line (27) can be observed in the central zone of the device, formed by a PVC tube with five rectangular bottom openings on wall (14), closed in both ends with a cap made of the same material (17).

In FIGS. 3a and 3b the device structure is shown, wherein a supporting plate (1) can be observed for the pulling tensors welded to the frame (10), a resin cover reinforced with fiberglass over a galvanized iron network (6), a lateral plastic membrane flap (7), rollers (11), wheels (12) and sanitary PVC pipes (8) having sanitary T pipes (9) at their bottom section, and a PVC suction pipe or line (27) attached to the open endings of said T pipes, said suction pipe or line (27) having openings wherein the opening area will be proportional to the installed suction capacity.

FIG. 4a shows a lateral right view of the device with the moving direction (2), a supporting plate (1) for the pulling tensors, whereas from the center a PVC suction pipe (8) emerges having a resin fiber collar attached at its base, said resin fiber collar being formed with fiberglass reinforcements (4) for the fastening and sealing of suction tubes, handles (5) for pulling, handling and lifting the device, the resin cover (6) and the lateral membrane flap (7). FIG. 4b shows a left side view of the device indicating the moving direction (2) and the device cover (6). FIG. 4c shows a rear view of the device indicating the device cover (6).

FIG. 5a shows a top view of the device structure indicating the moving direction (2) and FIG. 5b shows a top view of the device indicating the moving direction (2).

FIG. 6 shows the cleaning system with the suction device placed in the water body (41), wherein there is a pipe to draining chamber (28), plastic buoys (29) for floating a hose (36), platform (30) for the steersman and the deck operator of the boat (31) for pulling with an incorporated four-stroke engine and protected propeller, a pulling tubular labeled galvanized-steel connecting rod (32) astern, a suction device (33), a connection hose (34) from the boat (31) to the device (33), a connection piece (35) of the connection hose (34) with the suction hose (36), and a suction hose (36) that connects the movable electric suction pump (37) at the lake's shore with the boat (31).

FIG. 7 shows a longitudinal section of the suction device in which the partial configuration of the structural frame (10), the pulling rod (32) that connects the device (33) (not shown in this figure) to the pulling boat, the set of symmetric suction pieces (38) that connect the suction pipes (27) of the cart with the hose (34) connecting the device to the boat is described. In this figure also appear the projections of wheels (12) and rollers (11).

FIG. 8 shows a lateral view of the pulling boat (31), the suction device (33) placed in the bottom of the water body (41) of the lake, the placement of the roofed platform (30) for the boat operator, the connecting rods (32) between the device (33) and the boat (31), the symmetrical suction elements (38), and the connecting hose (34) with coupling pipe in the boat (35).

In FIG. 9, a rear view of the system is shown, indicating the connection hose (34), the pulling rods (32), the set of coupling pieces (38) for symmetrical suction from all four device inlets toward the connecting hose (34), the hose (36) with floats (29) that connects the boat connector (35) with the suction pump on land (37), and the pipe that leads to the drainage (28).

In FIG. 10, the following elements of the structure can be observed: recycle pipe (39) onto which injectors are arranged; injectors (40) arranged along all the perimeter of the water body; water body (41) contained by the structure; skimmers (42) for removal of floating contaminants such as water with oils; water inlet line and chamber (43) where water is extracted to feed the lagoon; zone of restricted natural circulation (44); fresh water feeding point (45) to the lagoon.

DESCRIPTION OF THE INVENTION

This invention comprises a process to obtain (i.e., to implement and maintain) large water bodies or volumes for recreational use with excellent color, high transparency and cleanness characteristics similar to swimming pools or tropical seas at low cost, in particular for water bodies larger than 15,000 m$^3$, such as artificial ponds or dams for recreational use. The present invention also discloses a structure to contain large water volumes. The invention also comprises a suction cart or suction device to extract a particulate material decanted from the water. The process of the present invention comprises in a first step providing a structure to contain large water volumes such as artificial lakes or ponds, with elements that allow water treatment and features required to obtain the desired aesthetic and sanitary results of having "color, transparency and cleanness similar to swimming pools or tropical seas at low cost".

The process has a great advantage over the previous art in that the desired characteristics are achieved without needing a filtration system or adding large amounts of chemicals, which opens the possibility to implement and maintain large crystalline water bodies with no size limit.

The process of the invention comprises the following steps or stages:

a.—providing a structure with skimmers able to contain a large water body larger than 15,000 m$^3$.

b.—feeding the structure of step (a) with inlet water having iron and manganese levels lower than 1.5 ppm and turbidity lower than 5 NTU.

c.—measuring water pH, ideally it should be within a range lower than 7.8;

d.—adding an oxidizing agent to the water contained in the structure of step (a), with which a 600 mV minimal ROP is controlled in water for a minimal period of 4 hours and in maximal cycles of 48 hours;

e.—adding a flocculating agent in concentrations within 0.02 and 1 ppm with maximal frequencies of 6 days and cleaning the bottom of the structure of step (a) with a suction device to remove precipitated impurities from the bottom of said structure, together with the additional flocculants and;

f.—generating a displacement of surface water containing impurities and surface oils by means of the injection of inlet water according to step (b), which generates said displacement in such a way to remove said surface water by means of a system for impurities and surface oils removal arranged in the structure of step (a).

It is worth mentioning that cleaning is performed in such a way that every sector of the structure is cleaned in time intervals no greater than 7 days, in such a way as to replace the traditional filtering performed in conventional size structures.

In the disclosed structure or lake in step (a) it should be maintained a minimal total water renewal rate of 150 days, preferably 60 days, to avoid the accumulation of oxidation products (ageing).

Each step of the process to implement and maintain large water bodies is separately detailed below, in the understanding that every obvious change will be encompassed within the scope of the present invention.

In step (a), a structure or pond is provided to contain a large water body larger that 15,000 m$^3$, with elements that allow water treatment and features required to obtain the desired aesthetic and sanitary results of having "color, transparency and cleanness similar to swimming pools or tropical seas at low cost". The features of the structure provided to carry out steps (b) to (f) of the invention will be noted by the reader when the structure specially designed for this invention is specifically described.

In step (b), and only in the case where it should be required, a water pre-filtering and treatment can be carried out on the water that is incorporated into the lake, in the case wherein the water contains incrusting micro-mollusks or turbidity levels over 5 NTU. Nevertheless, water inlet should not include micro-mollusks and metals such as iron or magnesium in order to maintain the aforementioned ranges. In other words, low turbidity water is preferable because the process of the present invention does not have a traditional filtration process and the suction device and skimmers would be inefficient in case of receiving high levels of suspended particles, including both organic and inorganic contaminants.

If in step (c) the pH is higher than 7.8, it is necessary to add bromine salts such as sodium bromide, always keeping minimal bromide concentrations of 0.6 ppm. It is worth mentioning that in the case of sea water, in spite of having pH values higher that 7.8, it naturally contains high bromide levels, and therefore it is not necessary to add this element if the artificial pond or lake is filled with sea water.

In step (d), to maintain a minimal redox potential of 600 mV in the water for a minimal period of 4 hours in maximal cycles of 48 hours, preferably 24 hours, oxidant agents are added such as: ozone, sodium or potassium persulfate, chlorine derivatives, hydrogen peroxide, bromine derivatives or by electrochlorination. The amount of applied oxidant is controlled by permanent measurement of ROP during the application in such a way that it fulfills the minimal established requirements, i.e. oxidant is added up to achieve a minimal of 600 mV during a period of 4 hours.

The type of oxidant depends on the cost, among other factors. Hypochlorite produced by electrochlorination and ozone are economical because they are produced in situ, but require high equipment investments.

The applied amount depends on many factors that vary daily, such as, for instance: temperature, solar radiation, environmental contamination, rain, storms, levels of use, etc. In short, the necessary oxidant amount is determined by ROP measurement.

Notwithstanding the foregoing and without limiting the invention, it can be stated that the usually used concentrations and the oxidant application ranges are those indicated in Table 1:

TABLE 1

Oxidant Application

| OXIDANT | USUAL CONCENTRATION * | MIN-MAX RANGE |
|---|---|---|
| Ozone | 0.05 ppm | 0.01-0.58 ppm |
| Hydrogen peroxide | 0.04 ppm | 0.01-0.46 ppm |
| Sodium hypochlorite | 0.16 ppm | 0.04-1.50 ppm |
| Persulfate | 0.28 ppm | 0.07-3.30 ppm |
| Bromines | 0.22 ppm | 0.05-1.80 ppm |

* Total amount added to reach and maintain the minimal 600 mV ROP for 4 hours, divided by the total volume of the water body.

Step (e) includes adding a flocculating agent and cleaning the bottom of the structure of step (a) with a suction device in order to remove precipitated impurities from the bottom of the lake, together with the flocculant agents.

Cleaning is performed in such a way that every sector of the lake is cleaned in time intervals no greater than 7 days, preferably every 4 days. With this step, together with the use of skimmers, traditional filtering processes used in swimming pools are replaced.

Among flocculants that can be added in this step (e), a cationic polymer is preferred, e.g. HICAT-1™, which is a biodegradable cationic polyelectrolyte with 25% solids, produced by Buckman Laboratories in the United States (it is accepted by the National Health Service of Chile and recommended to be used in swimming pools at concentrations 100 times higher) in concentrations between 0.02 and 1 ppm with maximal frequencies of 6 days, preferably 0.05 ppm every 24 hours; or addition of Crystal Clear™, which is a biodegradable cationic polyelectrolyte produced by AP Aquarium Products in the United States (it is used in aquariums in concentrations 100 times higher) in concentrations between 0.04 and 2 ppm with maximal frequencies of 4 days, preferably 0.16 ppm every 24 hours.

Additionally, this step can include adding algaecides such as quaternary ammoniums (e.g. polyquats) and/or copper compounds (e.g. $CuSO_4 \cdot 5H_2O$ or copper chelates), keeping copper levels between 1 ppb and 1.5 ppm, depending on temperature and sunlight; 0.3 to 1.5 ppm of copper for temperature ranges between 10° C. and 30° C.

It is important to keep in mind that the objective of the suction device is not only the cleaning of the bottom in the described process, as is the case of vacuum devices of traditional pools, but that said suction device replaces completely the traditional filtering system of swimming pools together with the use of flocculants. Furthermore, the fact that the process contemplates the displacement and removal of superficial water with impurities toward the structure slots complements the action of the suction device.

In other words, the suction device not only removes material naturally deposited on the bottom (leaves, branches, earth, etc.) but also all the suspended particles that are eliminated by filtration in the case of swimming pools and that are converted into floccules (large particles) and are suctioned by the device in this invention, thus decreasing their removal costs in two orders of magnitude.

In step (f) it is necessary to control the levels of injection of fresh water to ensure the correct displacement and removal of superficial water with impurities and oils through the skimmers of the structure provided in step (a) of the process of the invention.

As hereinabove mentioned, to carry out the process to implement and maintain large bodies of water larger that 15,000 $m^3$ according to the present invention, it is necessary to provide a structure like that shown as an example in FIG. 10.

The structure or pond according to the present invention includes bottoms and walls built with low permeability materials such as clay and bentonite, coated by a non-porous material, such as a polyvinyl chloride membrane, linear low density polyethylene or high density polyethylene capable of being cleaned, with a depth of at least 0.5 meters, a system for removing impurities and superficial oils by means of skimmers, a feeding pipe system that allows water replacement by entrance of fresh water, a feed water intake system, which can be marine water, well water, spring water or water from other sources; in the case of marine water the intake system can be through headers or wells positioned at a depth of more than 6 meters The relevance of the structure to solve the technical problem proposed in the process of the present invention is detailed as follows:

The structure must have skimmers to remove surface oils and particles, since otherwise they accumulate and deter water quality, even after performing all the chemical treatment steps, since these do not remove floating greases or solids. In this way, the final objective of obtaining "color, transparency and cleanness characteristics similar to swimming pools or tropical seas at low cost" would not be fulfilled without these skimmers. The process of movement of superficial water toward the skimmers caused by fresh water entry together with the flocculant-suction device system replaces the traditional filtering system of swimming pools.

The structure must have fresh water feeding pipes that allow causing the surface water movement that eliminates floating impurities and oils through the skimmers. These pipes contribute also the fresh water necessary to refresh water at the described rates, since otherwise oxidation subproducts accumulate, which render chemical treatments inefficient and deter water quality, not fulfilling the "color, transparency and cleanness characteristics similar to swimming pools or tropical seas at low cost".

The structure has a pipe network with injectors that allow an efficient application of the products and water homogenization. In swimming pools this is irrelevant, but in large volume water bodies the existence of isolated stagnant zones creates contamination centers that make disinfection treatments inefficient, thus deterring water quality and not fulfilling the fundamental objective of obtaining "color, transparency and cleanness characteristics similar to swimming pools or tropical seas at low cost".

The plastic liner must have special non-porous characteristics. In swimming pools this may be irrelevant, but in large volume water bodies cleaning would be unfeasible with adherent linings and a dark layer would form that do not allow obtaining the desired result, namely "color, transparency and cleanness characteristics similar to swimming pools or tropical seas at low cost".

The bottoms and walls must be built with low-permeability materials such as clay and bentonite, lined with a non-porous material such as polyvinyl chloride membrane, etc. This is the economic way of constructing these large water bodies, since if known building techniques for swimming pools or ponds would be used, the objective of "low cost" would not be obtained.

Water intake must be done in such a way as to avoid micro-mollusks, since besides blocking recycle pipes, said micro-mollusks adhere to surfaces generating a dark color that prevents obtaining the objective of "color, transparency and cleanness characteristics similar to swimming pools or tropical seas at low cost".

Water intake must avoid water with metals such as iron and manganese, since this pond does not have traditional filtration and the flocculation treatment and suction device are inefficient at removing inorganic impurities, including metallic contaminants.

The crystalline structures or ponds must have water intakes that allow using low cost water since, in contrast to swimming pools that recycle water through their filters, in this case the water from the skimmers and the suction cart or device is disposed of.

The structure provided in step (a) for the process of the invention has additionally:

1) light blue, white or light yellow bottom (liner) color, for the water to take the color of tropical seas, i.e. "color, transparency and cleanness characteristics similar to swimming pools or tropical seas at low cost". This is obvious in the case of swimming pools, but large ponds use dark plastics due to their durability and lower cost; that is the reason why there are no large water bodies with the described colors. For instance, if the plastic would be black (usual in ponds), the desired color would not be obtained even if the water had high quality and transparency.

2) a depth over 0.5 meters, preferably between 2 and 5 meters; Depth is important to achieve the desired color "similar to tropical seas", since if it is too shallow the water does not reach turquoise shades of color and resembles a light-colored water body. Moreover, due to the high water transparency of these ponds, if depth is too low UV light penetration deters the liner rapidly, thus not obtaining the desired low cost.

3) a recycling system by means of pipes with injectors that allow maintaining water homogeneity and avoiding stagnating zones. This system can be avoided in windy zones.

4) the structure must be constructed in such a way that it avoids dragging organic matter such as leaves and soil by effect of wind, watering, etc.

5) Optionally, it can be made of cement with coatings such as painting, polyurethanes or fiberglass.

Therefore, the structure is fundamental for the process of the invention, since in said structure it is also possible to generate a step consisting of the displacement of surface water containing impurities and oils by means of a current generated by fresh water injection through the pipe systems of said structure, thus removing said impurities and oils through said skimmers.

In the following, the suction device of the present invention is described in detail:

The suction device to carry out the cleaning of the structure bottoms, which is performed in step (e) of the process of the invention, comprises: a supporting plate, a resin collar reinforced with fiberglass, pulling handles, a resin cover, a lateral membrane flap, a steel frame, high density polyurethane rollers, auto-lubricated plastic wheels, an opening in a PVC pipe to suction the bottom, a brush line comprising plastic-based brushes with synthetic bristles and a steel platen with perforations or slots to fasten the brushes in a continuous line, supporting plates for the axles of the wheels and the rollers, and a suction PVC line with openings (see description of figures for more details).

The suction device operates by suctioning dirt through connecting hoses by means of a pumping system, said device being pulled by a system that includes a propelling device to move the suction device, such as a boat, for instance, a draining chamber, plastic buoys for aiding a hose to float, a platform for the steersman and the boat's deck operator in case a boat is used as propelling device, a pulling tubular labeled galvanized-steel connecting rod astern, a connection hose between the boat and the cart, a connection piece between the connecting hose and the suction hose that connects the pump placed at the structure edge. In any case, the propelling device of the suction device can also be formed by a remote mechanical traction system arranged out of the structure or any other propelling device useful to move the suction device.

The suction device is mainly formed by a structuring frame, a covering carcass with coupling means to be coupled to the pumping system, rolling means for continuous displacement over the surface to be cleaned and cleaning means consisting of a suction line and a brush line to remove the material to be cleaned by means of suction from the pumping system through the suction device.

The covering carcass comprises a laminar resin body that covers the structuring frame and the rolling and suction means. From the top section of the covering carcass supporting plates emerge for the pulling tensors from the boat, which are internally joined to the structuring frame; at its top section, said carcass also has suction PVC tubes that form coupling means to the pumping system and are attached by their base section to a carcass collar formed in molded resin fiber with glass fiber reinforcements for supporting and sealing said suction tubes; whereas from said carcass collar a resin mantle and a lateral membrane flap project to form the carcass body. Also its top section has handles for pulling, handling and raising the device.

The structuring frame is a steel frame to which an aligned series of steel plates for supporting the rolling means, which comprise the axles of high density polyurethane rollers and plastic auto-lubricated wheels, is supportively joined, and a perforated or slotted steel platen is likewise attached to support by means of bolts a continuous line of brushes having a plastic base and synthetic polyethylene bristles, or the like, which help in the task of removing the material to be suctioned. To the rear section, the abovementioned supporting plates of the pulling tensors are joined.

The cleaning means comprise a suction line formed by vertical PVC tubes, corresponding to suction tubes emerging upwardly from the covering carcass, to which T-shaped PVC tubes are attached at their bottom part, which are coupled in turn to horizontal tubes that have suction openings in their bottom part through which the removed material enters to be suctioned and taken out of the pond.

It is important to keep in mind that the objective of the suction device (suction cart) is not only the cleaning of the bottom in the described process, as is the case of vacuum devices of swimming pools, but that said suction device replaces completely the traditional filtering system of swimming pools together with the use of flocculants and the skimmer system.

If all the abovementioned elements are not present, water impurities accumulate and deter water quality, and so the final objective of the present invention, i.e. obtaining water bodies with "color, transparency and cleanness characteristics similar to swimming pools or tropical seas" at low cost, would not be obtained.

Application Example

To carry out the process of the invention to implement and maintain water bodies larger than 15,000 m$^3$ for recreational use with color, transparency and cleanness characteristics similar to swimming pools or tropical seas at low cost, the following steps or stages were performed:

A structure similar to an artificial lagoon was built in the central Chilean shore, having a length of 1 kilometer, an area of 80,000 m$^2$ and a volume of 250,000 m$^3$ (33"20'59.91"S; 71"39'10.10"W). The bottom was built using clay and bentonite, and it was lined with lineal low density polyethylene (LLDPE) and high density polyethylene (HDPE) plastic with white and yellow color. The walls were built in cement and clay and lined with LLDPE and HDPE membranes.

Minimal and maximal depths were 1.2 and 3.5 meters, being 2.8 meters the average depth.

A pipe system of 100 to 250 mm diameter was installed all around the lagoon borders to facilitate recycling. The system has homogeneously distributed injectors every 10 meters around the entire lagoon that are placed in the bottom to inject the products and maintain water homogeneity. Systems for the removal of impurities and superficial oils by skimmers were installed.

Water intake for this structure was achieved through headers. Inlet water had 0.08 ppm iron and 0.15 ppm manganese, and a turbidity of 1.4 NTU. The water had a pH of 7.93 and natural bromine concentrations of 48 ppm, and consequently no addition of bromine salts was required. The water was impounded through headers at a depth of 8 m at sea shore. The intake was performed at this depth to avoid incrusting micro-mollusks. The presence of micro-mollusks in sea water causes problems by growing, development and adhesion to piping walls and lagoon structures. Other possible way to avoid incrusting micro-mollusks is the use of water pre-filtering.

ROP value was maintained over 600 millivolts (mV) during 4 hours in 24-hour cycles. This was achieved by applying oxidants, such as e.g. ozone, hydrogen peroxide, potassium persulfate, electrochlorination or sodium hypochlorite. All the former were tested with good results.

In an average September day with an air temperature between 10 and 16° C. and a water temperature of 17° C., 0.11 ppm of sodium hypochlorite produced by electrochlorination were applied, which was sufficient to maintain ROP over 600 mV for more than 4 hours. This system is advantageous when working with salt water, because the electrolytic process transforms chloride in sea water in hypochlorite, with no need to add additional chemicals.

The established regulations for swimming pools in other countries indicate higher ROP values (between 650 and 750 mV) permanently, but this is not economically viable in large volumes of water and in this invention it has been demonstrated that keeping ROP over 600 mV during 4 hours in 24-hour cycles is enough to decrease the growth of microalgae and microorganisms in large water bodies, thus generating low-contamination conditions apt for swimming.

The bacteria *Escherichia coli*, a bacterial pathogen marker, dies after 100 seconds when exposed to a ROP of 600 mV, and consequently the 4-hour treatments have a high disinfectant power.

The water body volume of this example equals the volume of 6,000 familiar 8-meters-long swimming pools and is constructed in such a way that it does not receive visible contamination from the surroundings (leaves, soil, watercourses), and consequently contamination received from the environment is very low in relative terms when compared with a swimming pool. Proportionally, human contamination is also insignificant given the high dilution power (for example, 4 swimmers in a familiar pool equal 24,000 swimmers in the lagoon).

Additionally, the flocculation and bottom cleaning with the suction cart, and the removal of grease and superficial impurities by means of the skimmers allows keeping low organic matter levels, which decreases the use of oxidants.

Algaecide action was achieved by keeping an average copper level in the water of around 0.3 ppm, and the application was made by using copper salts (copper sulfate pentahydrate) in closed sacs, which is applied in the chambers through which recycling system water passes, in such a way that the salts dissolve slowly, and also by an copper electrode ionization process in which an electric current is applied to said electrodes and copper ions are released into the medium in a controlled way. Measured copper levels varied between 0.1 ppm at a temperature of 10° C. and 1.5 ppm at 30° C. (2 ppm are acceptable in potable water, see Table 4).

A cationic flocculating polymer was added. The flocculant used was HICAT-1™ in daily applications of 0.04 ppm through the recycling system.

With the aid of the suction cart or device, the plastic of the bottom of the lagoon was cleaned subsequently to decantation. The device has a system of suction chambers, thus removing all the precipitated impurities together with the polymer, which allows the bottom of the lagoon (membrane) to be seen. The device that cleaned the plastic membrane was pulled by a boat and did not leave any residual layer, because it was a fine cleaning and not a dredging. This cleaning and suction method was permanent and the bottom of the lagoon was cleaned daily, in such a way that the suction system passes by every membrane sector every four days.

The water was maintained in movement by means of a recycling system that operated 8 hours per day in low-wind seasons, thus keeping water homogeneity. Injectors distributed around the structure throw the water up to a long distance and are placed every 10 meters. It should be mentioned that the water contained by the structure also shows an important circulation as an effect of the wind and it should be possible to decrease the artificial recirculation requirements by a suitable design of the structure, thus sparing energy.

This recycling system was used to apply chemicals. The water of the structure was completely renewed in a period between 30 and 150 days. The aim of the renewal was to avoid "water ageing", which is the formation of secondary compounds derived from oxidation reactions. The renewal was performed by taking new water through the feeding pipes, independently from the recycling pipes that end at the injectors.

A superficial water outlet flow was kept by means of the skimmers that remove oils and superficial impurities.

The amount of added chemicals depends mainly on the temperature and is orders of magnitude lower than those required in swimming pools.

The total comparative maintenance cost per cubic meter was approximately 3% of the usual cost in swimming pools.

In this application example, the physicochemical conditions of water were determined to comply not only with regulations for recreational waters with direct contact (see Table 2), which are those applied in this case, but also with regulations for potable water (see Table 4), with the exception of characteristics inherent to sea water, and with regulations for swimming pools (see Table 3), with the exception of chlorine permanent residual levels, which do not apply because of the applied technology.

TABLE 2

Comparison of the water treated with the process of the invention and the regulation for recreational waters with direct contact (NCh 1333 *)

| PARAMETERS | MEASURED VALUE IN THE LAGOON | NCh 1333 |
|---|---|---|
| pH | 7.96 | 6.5 to 8.3 except if natural water conditions show diferent values, but in no case lower than 5.0 or higher than 9.0 |
| Temperature, ° C., maximal | 17.7 | 30 |
| Clarity, minimal * | 35 meters | Visualization of Secchi discs at a depth of 1.20 meters |
| Visible floating solids and unnatural foams | Absent | Absent |
| Floating oils and greases, mg/l, maximal * | <5 | 5 |
| Emulsified oils and greases, mg/l, maximal * | <5 | 10 |
| Color, Pc-Co Scale unit, maximal * | 10 Absent | 100 Absence of artificial colors |
| Turbidity, Silica units, maximal * | 0.55 | 50 |
| Fecal coliforms/100 ml, maximal * | <2.0 | 1,000 |
| Substances that cause inconvenient smell or taste | Absent | Absent |

* Official Chilean regulations were used (Chile was the country of the application example), Chilean rule NCh 1333

TABLE 3

Comparison of the water treated with the process of the invention and the regulation for swimming pools (NCh 209 *)

| PARAMETERS | MEASURED VALUE IN THE LAGOON | NCh 209 |
|---|---|---|
| pH | 7.96 | 7.2-8.2 |
| Free residual chlorine | + | 0.5-1.5 (ppm) |
| Copper (algaecides) mg/l | 0.38 | 1.5 maximal |
| Bromine (disinfectant) mg/l | + | 1-3 |
| Foam, grease and suspended particles | Absent | Absent |
| Colonies of aerobic bacteria/ml | 2 | ≦200 |
| Fecal coliforms | Absent | Absent |
| Total coliforms colonies/100 ml | ≦2 | ≦20 |
| Algae, larvae or other living organisms | Absent | Absent |
| Clarity | 35 meters | 1.4 meters |

* Official Chilean regulations were used (Chile was the country of the application example), Chilean rule NCh 209
+ Do not apply because of the applied technology

TABLE 4

Comparison of the water treated with the process of the invention and the regulation for potable water (NCh 409 *)

| PARAMETERS | UNIT | ASSAY METHOD | MEASURED VALUE IN THE LAGOON | Official 2005 NCh 409 |
|---|---|---|---|---|
| pH | — | (I) | 7.96 | 6.5 < pH < 8.5 |
| Turbidity | NTU | (I) | 0.55 | 2.0 |
| True color at pH = 7.71 | Pt—Co | (I) | 10 | 20 |
| Smell | — | (I) | Odorless | Odorless |
| Taste | — | (I) | + | Tasteless |
| Ammonia | mg/l $NH_3$ | (I) | 0.12 | 1.5 |
| Total arsenic | mg/l As | (I) | <0.005 | 0.01 [1] |
| Cadmium | mg/l Cd | (I) | <0.002 | 0.01 |
| Zinc | mg/l Zn | (I) | <0.05 | 3.0 |
| Total cyanide | mg/l CN | (I) | <0.05 | 0.05 |
| Chlorides | mg/l Cl | (I) | 18,914 | 400 [2] |
| Copper | mg/l Cu | (I) | 0.38 | 2.0 |
| Phenolic compounds | mg/l | (I) | <2 | 2 |
| Total chromium | mg/l $Cr^{+6}$ | (III) | <0.05 | 0.05 |
| Fluorine | mg/l F | (I) | <0.10 | 1.5 |
| Iron | mg/l Fe | (I) | 0.08 | 0.3 |
| Magnesium | mg/l Mg | (I) | 1.030 + | 125 |
| Manganese | mg/l Mn | (I) | <0.01 | 0.10 |
| Mercury | mg/l Hg | (I) | 0.001 | 0.001 |
| Nitrates | mg/l $NO_3$ | (I) | 4.54 | 50 |
| Nitrites | mg/l $NO_2$ | (I) | 0.04 | 3 |
| Lead | mg/l Pb | (I) | <0.02 | 0.05 |
| Total dissolved solids at 105° C. | mg/l | (I) | 34.310 + | 1,500 |
| Selenium | mg/l Se | (I) | 0.001 | 0.01 |
| Sulfates | mg/l $SO_4$ | (I) | 2,494 + | 500 [2] |
| Free residual chlorine in laboratory | mg/l | (III) | <0.05 | 0.2-2.0 |
| Nitrate + Nitrite Ratio | — | (I) | <1 | 1 |
| Organic substance | | | | |
| Tetrachloroethene | µg/l | (*) | n.d. | 40 |
| Benzene | µg/l | (*) | n.d. | 10 |
| Toluene | µg/l | (*) | 0.01 | 700 |
| Xylenes | µg/l | (*) | n.d. | 500 |
| Pesticides | | | | |
| D.D.T + D.D.D. + D.D.E. | µg/l | (*) | n.d. | 2 |
| 2,4 D | µg/l | (*) | n.d. | 30 |
| Lindane | µg/l | (*) | n.d. | 2 |
| Methoxychlor | µg/l | (*) | n.d. | 20 |
| Pentachlorophenol | µg/l | (*) | n.d. | 9 |
| Secondary products of disinfection | | | | |
| Monochloramines | mg/l | (*) | <0.1 | 3 |
| Dibromochloromethane | mg/l | (*) | <0.005 | 0.1 |
| Dichlorobromomethane | mg/l | (*) | n.d. | 0.06 |
| Tribromomethane | mg/l | (*) | 0.037 | 0.1 |
| Trichloromethane | mg/l | (*) | n.d. | 0.2 |
| Trihalomethanes | mg/l | (I) | <1 | 1 |

MICROBIOLOGICAL ANALYSIS

| PARAMETERS | EXPRESSED AS | ASSAY METHOD | MEASURED VALUE IN THE POND | Official 2005 NCh 409 |
|---|---|---|---|---|
| Total coliforms | MPN/100 ml | (V) | <2.0 | <2.0 |
| Escherichia coli | MPN/100 ml | (V)-(*) | ABSENT | ABSENT | n.d. Indicates not detected

\* Official Chilean regulations were used (Chile was the country of the application example), Chilean rule NCh 409

+ Inherent values of sea water.

In this example, it has been demonstrated that it is possible to maintain a water body or volume similar to a large-volume (250,000 m³) artificial sea water pond with a water quality similar to conventional swimming pools and tropical seas, both in its aesthetic characteristics as in its physicochemical and bacteriological properties. The achieved characteristics have not been found in any existing artificial lagoon in the world up to date (see Google Earth) and this can be demonstrated by satellite comparison of the transparency and color of the lagoon to be protected (33"20'59.91"S;

71"39'10.10"W) with the tens of thousands existing in the world, such as golf court and public park lagoons, dams for recreational use, lagoons of real estate and tourist projects, and even dams over 15,000 m³ built with swimming purposes (e.g. Piscina do Ramos in Brazil, Darwin Swimming Pool in Australia, Orthlieb Swimming Pool in Casablanca, Morocco).

We have not found any artificial water body in the world with a volume higher than 15,000 m³ having crystalline water with this quality, except for the structure similar to an artificial lagoon that we want to protect, which has 250,000 m³.

In a Google Earth™ forum (Internet software for satellite photography of the world) people has been searching for two years for the biggest swimming pool in the world that can be seen from the air. The conclusion, when reviewing their results, is that the lagoon of the application example is by far the biggest crystalline water body found.

The biggest known swimming pool in the world that uses traditional filtering and recycling systems is Sunlite Pool of Coney Island, United States, having 11,350 cubic meters of water. In the remaining tens of thousands of large artificial water bodies existing in the world, the water is not filtered or it is only partially filtered. As previously mentioned, the characteristics of the water of these bodies are very different from swimming pools or tropical seas and their uses are limited.

Filtering large water volumes is technically complex and highly costly, and consequently this is a barrier for the scaling-up of crystalline water bodies. The suction device of the present invention removes suspended solids (turbidity) that flocculate together with the polymer in an efficient and economic way, thus replacing filtering.

In addition to the high costs, the traditional filtering system does not solve the cleaning of the bottom of the lagoon.

The technology described in this invention patent, i.e. the replacement of filtering by a suction device and skimmers plus the application of controlled oxidation pulses, which are essential parts of the process, allows breaking the barrier that hinders the construction of crystalline lagoons with unlimited extensions and volumes, thus opening a new field of tourist applications.

The main advantage of the implemented process is evidenced by comparing the regulations for recreational waters and the results obtained in the artificial lagoon of the example.

Additionally, the level of transparency obtained in the water is highly important, being the clarity equal or higher than 35 meters, which is a result not found in any water body larger than 15,000 m³ nor in the majority of swimming pools; in fact, the swimming pool regulation demand only 1.4 meters of clarity (see Table 3).

Other advantages of the disclosed process of the present invention are:

Low maintenance costs.
  Established regulations for recreational waters with direct contact are widely fulfilled (see Table 2) and comparable parameters of the swimming pool and potable water regulations are also fulfilled (see Tables 3 and 4).
  The water in the lagoon is always absolutely transparent, with no turbidity, with the characteristic turquoise color of swimming pools or tropical seas and with a clean bottom, which are optimal visual characteristics for the acceptation of the user public.
  Use of oxidant, algaecide and disinfectant concentrations up to 100 times lower that those recommended to be applied in conventional swimming pools; this advantage favors the users and is more environmentally-friendly.
  As these water bodies are disconnected from the sea or near natural lakes, they are not affected by temperature variations produced by oceanographic currents, ice thawing, etc. but only by environmental variables (temperature, solar radiation, wind). In practical terms, in the lagoon of the application example in summer, temperatures of more that 10° C. higher than those of the sea are obtained.
  Flocculation and bottom cleaning by suction together with skimmers replace the filter system of conventional swimming pools, thus generating high transparency conditions at a very low cost. The removal of sediments prevents said sediments to consume oxidants and generate anoxic zones, and they allow the bottom membrane to give an attractive tonality to the lagoon's water.
  Water bodies can be built with no size limit having optimal aesthetical, physicochemical and sanitary conditions, which generates large tourist attraction poles.

In order to make more evident the surprising effect of the process disclosed in the present invention, Table 5 is shown, which illustrate the costs for both cleaning methods in the water body of the application example (250,000 m³).

TABLE 5

Comparison of the traditional filtering method* and the suction device

|  | Specifications | Volume circulated through pumps | Installation costs | Monthly operation costs |
|---|---|---|---|---|
| Traditional filter | 120 15 HP Three-phase Aral-C 3000 pumps (Astral code 01206) 60 Praga 3000 filters (Astral code 15781) 714,000 kilograms of sand (Astral code 905000) 60 batteries of 250 mm valves (Astral code 19133) Installation labor Shed of 2,500 m² Total monthly energy required, 24 hours * 30 days * 1343.28 kW/hour (967,164.18 kW/hour) Operators Maintenance | 2,893 lts/sec | US$ 2,686,648+ | US$ 119,246 |
| Suction device | Windglider boat Protected outboard 9.5 HP motor | 10 lts/sec | US$ 25,166 | US$ 2,242 |

TABLE 5-continued

Comparison of the traditional filtering method* and the suction device

| Specifications | Volume circulated through pumps | Installation costs | Monthly operation costs |
|---|---|---|---|
| Suction device | | | |
| Suction pump 7.5 HP | | | |
| Hoses, accessories | | | |
| Fuel | | | |
| Flocculant | | | |
| Operator | | | |
| Maintenance | | | |

*Considering T = 2 (minimal rate for swimming pool filtration) according to regulation NCh 209
⁺Does not consider the cost of the land for the 2,500 m² shed.

It is important to keep in mind that to obtain the desired final result of "color, transparency and cleanness characteristics similar to swimming pools or tropical seas at low cost", it is essential to have a water containing structure that have the required elements for water treatment and features that allow obtaining the desired results. The isolated application of the physicochemical process for water treatment would not be possible nor would it produce the desired results.

The invention claimed is:

1. A structure to contain a large water body, including a water body larger than 15,000 m³, for recreational use with color, transparency and cleanness characteristics similar to swimming pools or tropical seas, wherein the structure includes a bottom and walls covered with a plastic liner made of a non-porous material able to be thoroughly cleaned; wherein the depth of the structure to the bottom is about 0.5 meters or higher; wherein the structure includes a system of skimmers for the removal of impurities and surface oils, a fresh water feeding pipe system that allows entrance of fresh water and results in water removal by displacement of surface water through the skimmer system, and a pumping system including a coupling means connected to a moveable suction device for cleaning the plastic liner.

2. The structure according to claim 1, wherein the non-porous material is a membrane made of a material selected from the group consisting of linear low-density polyethylene and high density polyethylene.

3. The structure according to claim 2, wherein the color of the non-porous material is light blue, white, or yellow.

4. The structure according to claim 1, wherein the structure has a depth between 2 and 5 meters.

5. The structure according to claim 1, wherein the structure has a recycling system that uses pipes with injectors which allow maintaining water homogeneity by avoiding stagnating zones and allow the application of chemicals.

6. The structure according to claim 1, wherein said structure has a water inlet line and water inlet chambers through which water is extracted to feed the fresh water feeding pipe system of the structure.

7. The structure according to claim 1, wherein the walls define a border, and wherein the system of skimmers is positioned along the border.

8. A structure to contain a large water body, including a water body larger than 15,000 m³, for recreational use with color, transparency and cleanness characteristics similar to swimming pools or tropical seas, wherein the structure has a border and includes: a bottom and walls along the border built with a low-permeability material, wherein the bottom and walls are lined with a non-porous plastic membrane material able to be cleaned; wherein the depth of the structure to the bottom is at least about 0.5 meters, and up to about 5 meters; a system of skimmers disposed along the border for the removal of impurities and surface oils; a recycling piping system installed around the border of the structure and including a plurality of water injectors distributed along the border for injecting water into the water body to maintain homogeneity; a fresh water feeding pipe system that allows entrance of fresh water and results in water removal by displacement of surface water through the skimmer system; and a pumping system including a coupling means connected to a moveable suction device for cleaning the plastic liner.

9. The structure according to claim 8, wherein the low-permeability material of the wall is selected from the group consisting of clay, bentonite and cement.

10. The structure according to claim 8, wherein the non-porous plastic membrane material is a material selected from the group consisting of polyvinyl chloride, linear low-density polyethylene and high density polyethylene.

11. The structure according to claim 10, wherein the color of the non-porous material light blue, white, or yellow.

12. The structure according to claim 8, wherein the structure has a depth between 2 and 5 meters.

13. The structure according to claim 8, wherein said structure has a water inlet line and water inlet chambers through which fresh water is extracted to feed the fresh water feeding pipe system of the structure.

14. The structure according to claim 13, wherein the water inlet chambers are constructed at a depth of more than 6 meters below the sea surface.

* * * * *